United States Patent
Allen et al.

(10) Patent No.: US 6,301,932 B1
(45) Date of Patent: Oct. 16, 2001

(54) METHOD FOR FORMING AN INTERNALLY CHANNELED GLASS ARTICLE

(75) Inventors: Stephen R. Allen, Corning; James G. Anderson, Beaver Dams; Robert J. Kiphut; Jackson P. Trentelman, both of Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/308,554
(22) PCT Filed: Nov. 7, 1997
(86) PCT No.: PCT/US97/20484
  § 371 Date: May 20, 1999
  § 102(e) Date: May 20, 1999
(87) PCT Pub. No.: WO98/21154
  PCT Pub. Date: May 22, 1998

Related U.S. Application Data

(60) Provisional application No. 60/030,874, filed on Nov. 13, 1996.

(51) Int. Cl.$^7$ .......................... C03B 23/035; C03B 23/02
(52) U.S. Cl. .................. 65/106; 65/107; 65/110; 65/34; 65/36; 65/44; 65/45; 65/54; 65/67; 65/68; 65/86; 65/87; 65/93
(58) Field of Search .................. 65/34, 36, 44, 65/45, 53, 54, 67, 68, 77, 86, 87, 93, 106, 107, 110, 257, 258

(56) References Cited

U.S. PATENT DOCUMENTS 805,610 * 11/1905 White.
3,347,652 * 10/1967 Giffen.

* cited by examiner

Primary Examiner—Michael P. Colaianni
(74) Attorney, Agent, or Firm—Milton M. Peterson; Anca C. Gheorghiu

(57) ABSTRACT

The present invention is directed to a method for forming glass articles containing enclosed channels. The method comprises the following steps: a) delivering and depositing a first length of a molten glass ribbon (18) to a surface of a mold (20) having a mold cavity (22) possessing at least one channel-forming groove (22) and a peripheral surface, wherein the first length (18) overlies the mold cavity (22) and the peripheral surface; b) allowing the first length of the molten glass ribbon (18) to substantially conform to the contour of the mold cavity (22) resulting in the formation of at least one channel in the first length of the molten glass ribbon (18); c) delivering and depositing a second length of the molten glass ribbon (26) to the exposed surface of the first length of the molten glass ribbon (18). The delivered molten glass viscosity of the molten glass ribbon (18, 26) is such that the following is achieved: 1) the second length (26) bridges but does not sag into complete contact with the channel portion of the earlier-deposited first length (18): and 2) a hermetic seal is formed wherever the molten glass' first (18) and second lengths (26) contact.

11 Claims, 5 Drawing Sheets

METHOD FOR FORMING AN INTERNALLY CHANNELED GLASS ARTICLE

This application claims benefit of provisional application Ser. No. 60/030,874 filed Nov. 13, 1996.

BACKGROUND OF THE INVENTION

The present invention relates generally to glass articles and forming, and particularly to a method for forming glass envelopes, i.e., glass articles, possessing enclosed internal channels, for use in light emitting neon display devices.

DESCRIPTION OF THE RELATED ART

Neon lighting devices are disclosed in U.S. Pat. No. 4,584,501 (Cocks et al.), U.S. Pat. No. 4,990,826 (Cocks et al.), U.S. Pat. No. 5,036,243 (Cocks et al.). Generally, these patents disclose multifaceted lighting devices comprising glass or other vitreous plates which are hermetically sealed together to form a device with internally enclosed channels. These channels are thereafter evacuated and backfilled with an inert gas such as neon and thereafter ionized through the provision of a series of electrodes.

Generally, the method for forming the glass component of these prior art neon lighting devices involves cutting channels in a bottom glass plate followed by hermetically sealing, via the use of a glass frit, a glass top plate to this channeled glass bottom plate. Various methods are used to cut the channels into the bottom glass plate including grinding, etching and sand blasting through an adhesive rubberized mask exhibiting a pattern identical in shape to the desired channel pattern. The result of this cutting and subsequent fritting is that formation of the glass component of these lighting devices is an expensive and inefficient process with the resultant glass component being too heavy for use in those applications where weight is a concern, e.g., automotive applications.

Other more recent flat type lighting devices are disclosed in U.S. Pat. Nos. 5,041,762 (Hartai), 5,220,249 (Tsukada) and 5,223,262 (Lynn et al.). However, each of these references produces the glass body in generally the same manner, two glass plates fritted or sealed together. For example, Tsukada discloses a pair of transparent plates assembled and sealed together by a solder glass with a groove formed on the surface of one of the transparent glass plates thereby forming a discharge channel.

Recently, an improved method for forming glass bodies for use as discharge lighting devices has been disclosed in U.S. Pat. App., Ser. No. 08/634, 485 (Allen et al.); co-assigned to the instant assignee, and herein incorporated by reference. Briefly, this method, as illustrated in FIG. 1 involves two, separately delivered and deposited, molten glass ribbons, i.e., a sealing ribbon laid over the top of the already deposited channel-forming ribbon. This method involves the use of separate glass delivery systems each having its own set of glass delivery rollers and associated glass gobs. For very thin products/thin ribbons, the difficulty with this method is that in order to maintain a time-efficient process, the rollers must be spaced very close together and run a very high speed, e.g. rollers spaced 12 in. apart and moved at a speed of about 17"/sec. As such, any additional processing which must be done to the first ribbon must be accomplished in a very short, unmanageable period of time, i.e., before the delivery and deposit of the second/sealing ribbon, thus making the process somewhat inflexible. For instance, additional processing such as, the application and release of a vacuum to the underside of the ribbon to enhance conformance and/or the application and release of a vacuum to create and maintain pockets in the channel-forming ribbon for later delivery of air to support the sealing ribbon. It therefore became necessary to design a process which is far less dependent upon the roller spacing, thus allowing greater flexibility.

As such, the principal objective of the present method is to provide for an improved, more flexible method of forming the glass component for use in neon lighting devices; one which is simpler, more efficient, and less dependent on roller spacing than the prior art multiple ribbon method.

SUMMARY OF THE INVENTION

Accordingly, the present invention for forming glass articles containing internally enclosed channels comprises the following steps: (a) delivering and depositing a first length of a molten glass ribbon to a surface of a mold having a mold cavity possessing at least one channel-forming groove and a peripheral surface, wherein the first length of ribbon overlies the mold cavity and the peripheral surface, (b) causing the first length of ribbon to substantially conform to the contour of the mold cavity thereby forming at least one channel in the first length, (c) delivering and depositing a second length of the molten glass ribbon to the exposed surface of the earlier deposited first length of molten glass ribbon.

The viscosity of the molten glass ribbon at delivery is between about 1000 to 5000 poise so that the following is achieved: (1) the second length of the molten glass ribbon bridges, but does not sag into complete contact with the entire surface of the channel of the first length of the molten glass ribbon; and, (2) a hermetic seal is formed between the first and second lengths of the molten glass ribbon wherever they contact.

DETAILED DESCRIPTION OF THE INVENTION

Figure 1:
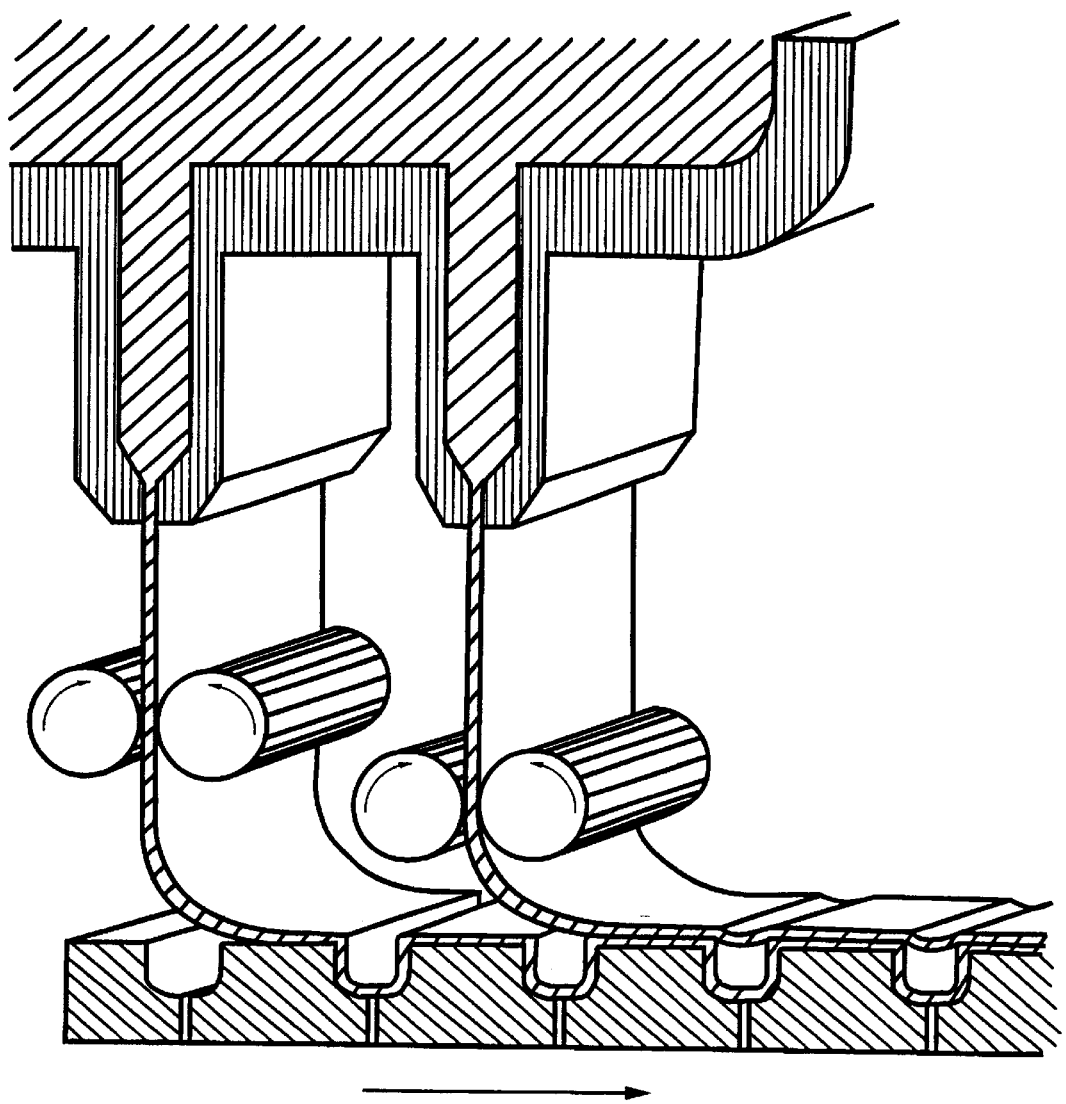
FIG. 1 is diagrammatic perspective and cutout view of the prior-art method of forming glass envelope bodies.
Figure 2:
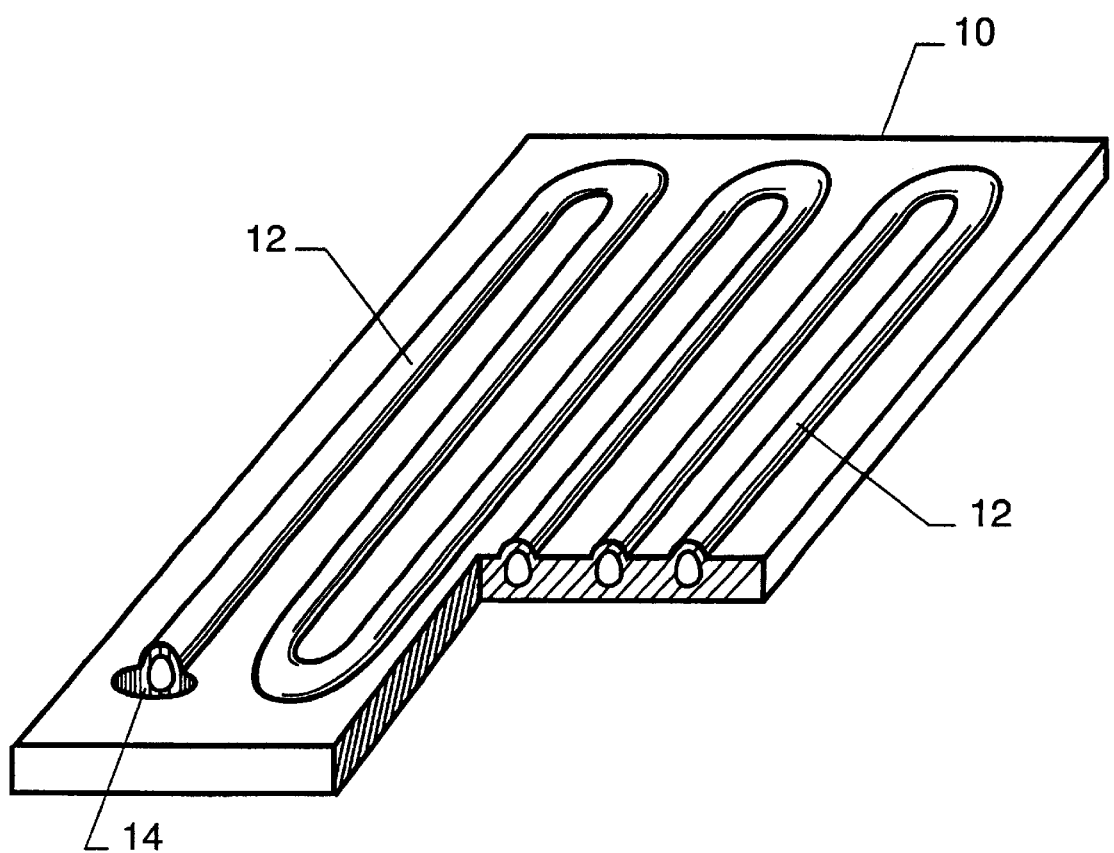
FIG. 2 is a perspective and cutout view illustrating an embodiment of a glass article which is capable of being produced by the forming method disclosed herein.

FIG. 2 illustrates a typical embodiment of a glass article 10 capable of being produced using the forming method disclosed herein. Glass article 10 exhibits at least one internal or enclosed channel 12, i.e., a glass envelope. Channel 12 possesses tubulation ports 14 located at the opposite ends of the channel, each communicating with the external environment. The tubulation ports are the future sites where the channel of the glass article is evacuated and thereafter backfilled with neon or other inert gas. Additionally, glass article 10 may possess a plurality of internal channels of a predetermined pattern each possessing at least a pair tabulation ports located at the opposite ends of each respective channel.

Figure 3:
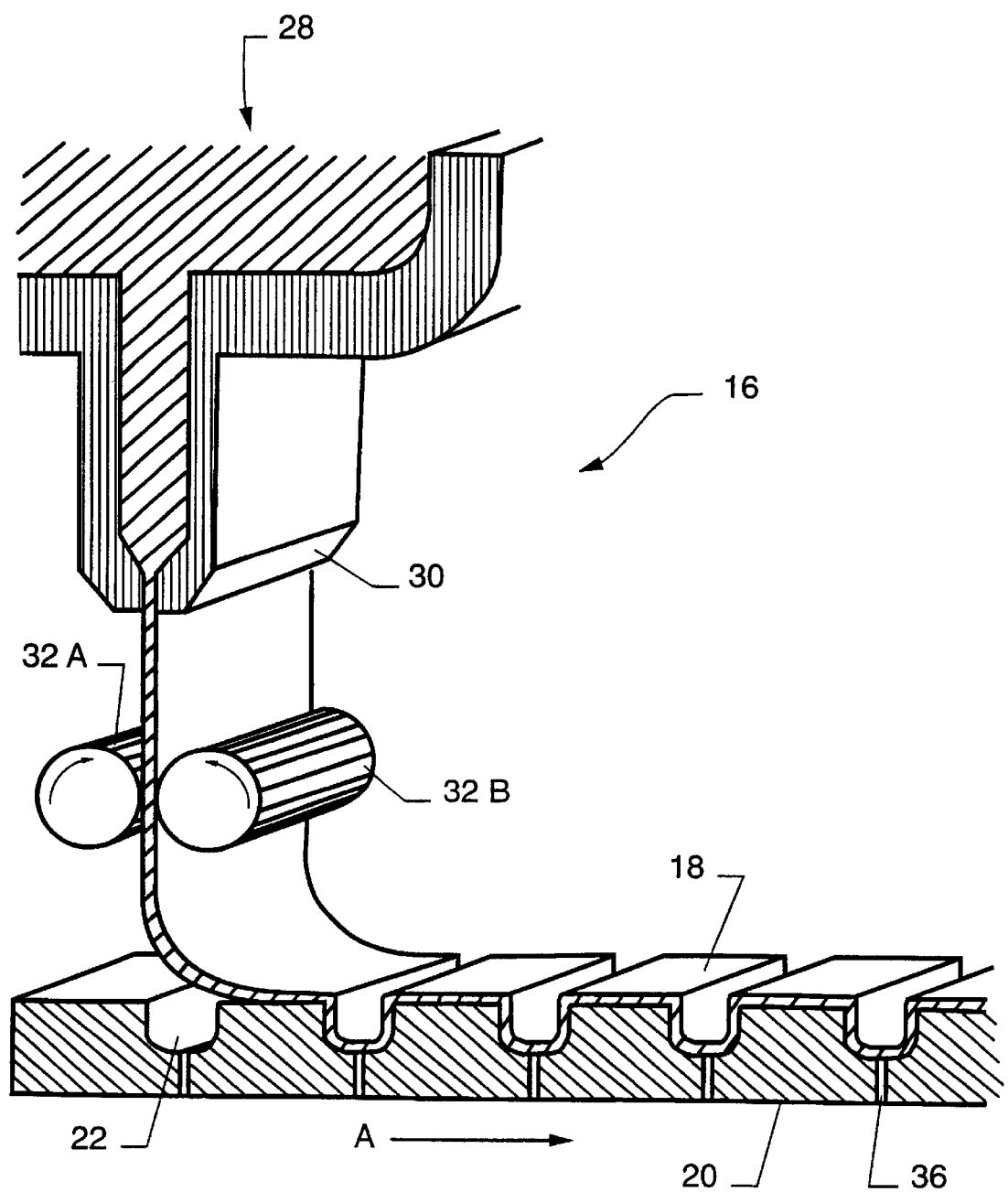
FIG. 3. is diagrammatic perspective and cutout view of the beginning stages of the instant method of forming glass envelope bodies.
Figure 4:
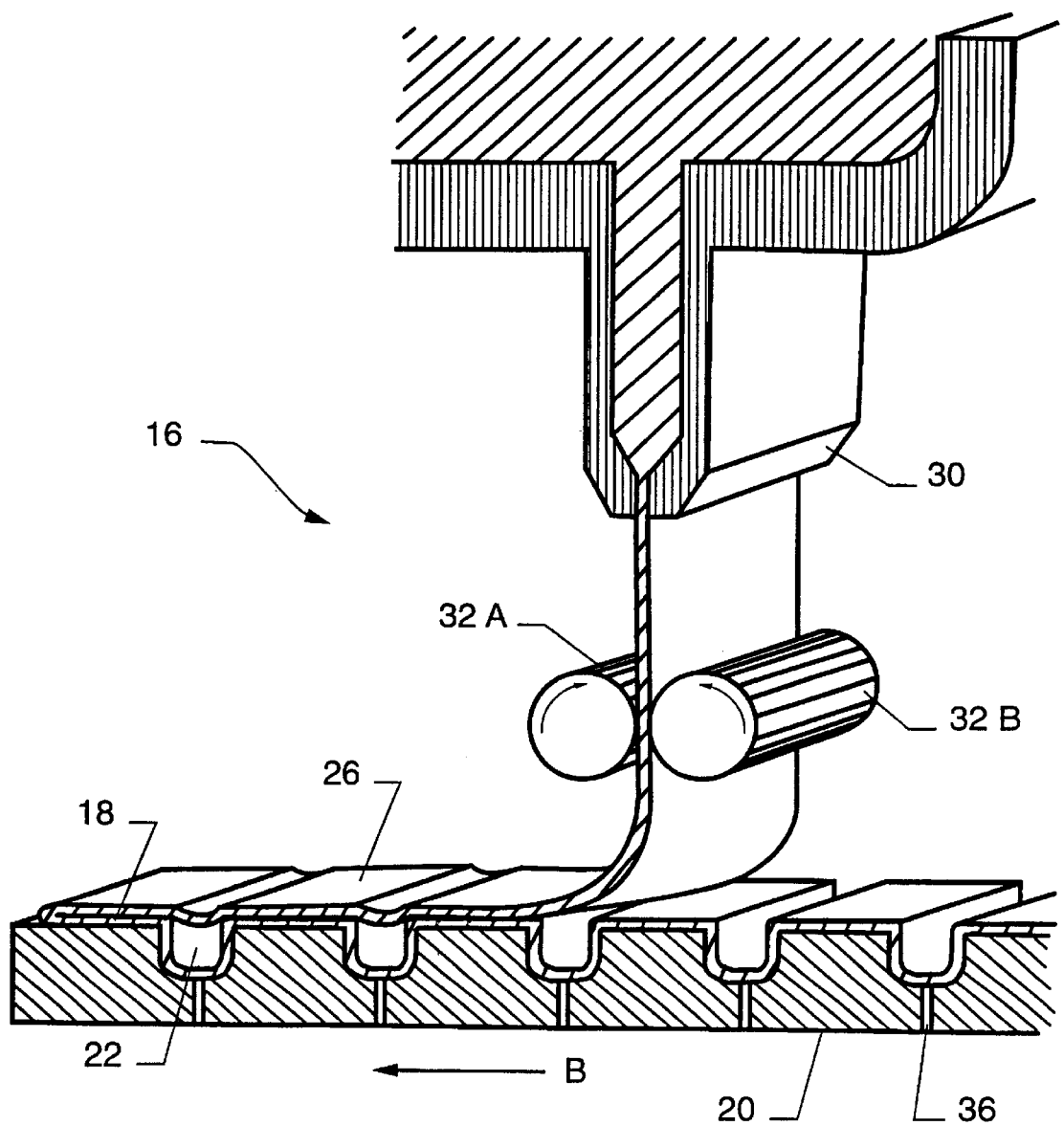
FIG. 4 is a diagrammatic perspective and cutout view of a later, intermediate stage of the instant method of forming glass envelope bodies.

Referring now to FIGS. 3 and 4, illustrated therein is the apparatus 16 necessary for forming the glass envelopes; the apparatus being similar to that disclosed in U.S. Pat. No. 4,361,429 (Anderson et al.), which is hereby incorporated by reference. In general, the instant method comprises the following steps: (a) delivering and depositing a first length of a molten glass ribbon 18 to a surface of a mold 20 possessing at least one channel-forming groove 22 and a peripheral surface portion 24 (see FIG. 5), wherein first length of the molten glass ribbon 18 overlies channel-forming groove 22 and peripheral surface 24; (b) causing first length 18 to substantially conform to the contour of channel-forming groove 22, thereby forming at least one channel in first length of the molten glass ribbon 18, (c) delivering and depositing a second length of the molten glass ribbon 26 to the exposed surface of first length 18.

Referring again to FIGS. 3 and 4, the method will now be explained in greater detail. Molten glass from a common furnace (not shown) and a common "main-line" forehearth 28 is fed to delivery conduit having a glass orifice 30 which thereafter delivers a stream of molten glass to a set of water-cooled rollers 32A/32B. A forehearth temperature control (not shown) allows control of the temperature of the molten glass, which, in turn, allows the glass stream to be delivered at a predetermined and controlled glass viscosity. Water-cooled rollers 32A/32B, rotating in opposite directions, thereafter squeeze the molten glass into a continuous ribbon shape.

Upon exiting the rollers, first length of the molten glass ribbon 18 is deposited upon mold 20 which is moved along a predetermined path, preferably a direction along the mold's width; although, the molten ribbon could be deposited, in a direction along the mold's length. Mold 20, as depicted in FIGS. 3 and 4, is a cross-section of mold 20 5 depicted in FIG. 5, as indicated by the line A—A.

First length of molten glass ribbon 18 is deposited so as to overlie grooveforming channel 22 and the surrounding peripheral surface area 24. Once delivered, first length of the molten glass ribbon 18 is thereafter caused to substantially conform to the contour of channel-forming groove 22 resulting in the formation of at least one channel in the first length of the molten glass ribbon 18. In one embodiment, first length of the molten glass ribbon 18 is allowed to substantially conform to the contour of channel forming groove 22 solely by means of the force of gravity.

In a preferred embodiment, resulting in enhanced and accelerated conformance of the first length of the molten glass ribbon 18 to channel forming groove 22, the method involves the additional step of applying a vacuum to the under surface of first length 18. As soon as the complete mold area is covered by first length of the molten glass ribbon 18, a vacuum is applied between mold 20 and first length 18 via a vacuum line (not shown). Vacuum line, attached to a vacuum source (not shown), communicates with a series of vacuum-vent holes 36 which are routed through the mold body itself from and open at several locations on the glass surface of the mold, at the bottom of channel-forming grooves 22. A vacuum may be applied immediately after the first length of the molten glass ribbon is deposited , or such vacuum may be applied immediately after the first length 18 has initially sagged partially within the mold cavity channel forming groove. When the vacuum is applied between the glass and mold, the glass is forced to be in immediate and intimate contact with the mold, allowing the glass to be formed to the desired shape, while also initiating the cooling and hardening of first length of the molten glass ribbon 18.

Referring now to FIG. 4, following the conformance of the first length 18 to the mold cavity through either gravity or vacuum forming or a combination of the two, the mold 20 is thereafter moved back along a second predetermined path opposite that of direction A: i.e. direction B. As earlier. the stream of molten glass continues to be delivered from the glass orifice 30 and thereafter to the water-cooled rollers 32A/32B which are rotating in opposite directions with respect to each other. These rollers thereafter squeeze the molten glass into to a continuous ribbon shape, i.e., second length of the molten glass ribbon 26, which is deposited upon and overlies the exposed surface of the first length of the molten glass ribbon 18. Second length of the molten glass ribbon 26 simply lies on the on first length 18, bridging itself across the formed channels due to the relatively high viscosity of the molten glass ribbon. In other words, second length of the molten glass ribbon 26 is essentially folded over and onto first length of the molten glass ribbon 18.

The bulk viscosity, at delivery, of the molten glass of the first and second ribbon lengths should be such that the following is achieved: (1) the second length of the molten glass ribbon 26 bridges, but does not sag into complete contact with, the channel portion of the previously deposited first length of molten glass ribbon 18 and (2) a hermetic seal is formed wherever the first and second lengths of the molten glass ribbon contact; via inherent flow viscosity characteristics of the particular glass. Preferably, the molten glass, at delivery, exhibits a bulk viscosity, of between about 1000–5000 poise. Unlike the earlier described two-ribbon technique however, there is no need to deliver the first length of the molten glass ribbon at a slightly lower initial bulk viscosity than the second length, as there is no need to compensate for the working time prior to delivery of the second length.

It does however follow that the bulk viscosity of the first length of the molten glass ribbon at the time of the deposition of the second length of the molten glass ribbon, is higher than that of the second length due to the working time or cooling which has occurred. Furthermore, a surface-to-mold viscosity gradient is likely to have developed in this first length. However, this first length of the molten glass ribbon should not have been allowed to cool or become so viscous at its surface that the two lengths of the molten glass ribbon can not "set-up" wherever they contact and therefore not form the desired hermetic glass-to-glass seal. Ideally, the bulk and surface viscosities should be maintained such that hermetic sealing detailed above is achieved; i.e., glass viscosities when the second ribbon length is delivered and deposited on the first ribbon length such that a glass-to-glass hermetic seal is formed. Furthermore, it is also necessary to minimize the surface to mold viscosity gradient of the first length so that unnecessary stresses do not build up within the so-formed glass article. By utilizing rollers and molds which are comprised of a low-conductive material, less heat will be extracted from the surface of the either length of the molten glass ribbon and therefore less of viscosity gradient has developed, mold materials which have been utilized include stainless steel 420, while rollers fabricated of Inconel 718 have been utilized. In addition, the quicker the depositing of the second length of the molten glass ribbon, the less variation in the surface to mold viscosity. In sum, the materials which should be used for the roller and the mold, as well as the cycle time between the ribbon deliveries should be empirically determined by one skilled in the art such that a hermetically sealed glass article exhibiting manageable internal stresses results. One final parameter which should be noted: the typical interval between delivery of the first length of the molten glass ribbon and second length of the molten glass ribbon was approximately 12 seconds.

Figure 5:
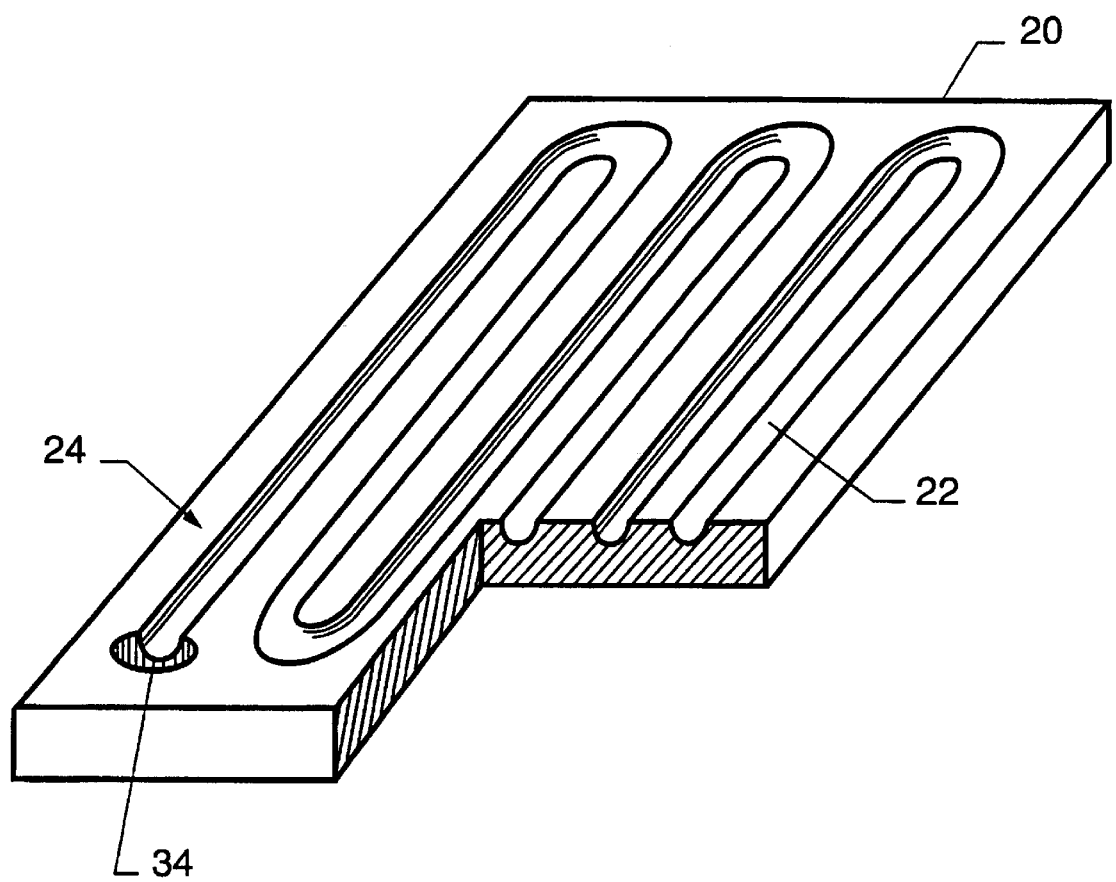
FIG. 5 is perspective view illustrating the mold utilized in the inventive method for forming the glass article depicted in FIG. 2.

Referring to FIGS. 3,4 and 5, mold 20 has a predetermined shape possessing the design necessary to result in product which meets desired final product specification, i.e., a distribution of grooves, indentations, holes, inserts and peripheral edges. Additionally, the shape and configuration of the groove design imparted to the mold determines the form and pattern of the so-formed glass article and ultimately any neon lighting device formed therefrom. Referring specifically now to FIG. 5, illustrated therein is one embodiment of a mold 20 in accordance with the present invention, i.e., a mold designed to produce the glass article like that depicted in FIG. 2. Mold 20 possesses at least one channel-forming groove 22 in the desired or predetermined pattern and two "deep-draw" pocket areas 34 at the respective ends of groove 22 for forming the aforementioned tubulation ports; molten glass will be drawn (gravity drawn or by vacuum actuation) into these pocket areas 34 to form these tubulation ports. Utilization of a mold which possesses these two deep-draw pockets results in the formation of a shaped glass article which possesses areas, i.e., tubulation ports, which allow for evacuating and backfilling with an inert gas.

In the case of products that could be made from narrow ribbon, i.e., a ribbon size of up to about 10" wide, a simple round orifice would be sufficient. On the other hand, if thin products are to be produced, exhibiting a thickness of up to about 0.1", a near "net shape" delivery system is preferable; i.e., an orifice which exhibits a high aspect ratio similar to the product itself For instance, slotted-type orifices deliver molten glass exhibiting a thermal uniformity which produces glass articles of the best quality. The roller apparatus may exhibit a design whereby the spacing between the two rollers 32A/32B is easily and quickly modified, thus allowing the gap or spacing between the rollers to be changed between delivery of the first and second lengths of the molten glass ribbon. This, in turn, would allow for the formation of molten glass layers, and ultimately glass bodies, having different layer thicknesses, if desired. Furthermore, as in the previous methods, patterns may also be machined into the rollers for purposes of changing the thickness distribution of the glass ribbon as well for as imparting knurled or decorative patterns to the surface of the so-formed glass article.

The second length of molten class ribbon 26 could be subjected to forming measures in addition to those imparted to it by gravitational forces, including pressing the ribbon with pressing or plunger apparatus (not shown) for purposes of assuring good glass-to-glass sealing between the respective ribbon lengths. However, care should be taken to press the second molten glass ribbon length into position whereby it bridges but is not pressed into contact with the entire surface of the channel formed in the first molten glass length.

In a preferred embodiment of the above method the "deep draw" pockets are in communication with an air line/orifice and at least a partial vacuum is maintained during deposition of the first length of molten glass ribbon resulting in the glass in the cavity remaining open; i.e., the glass deposited and pulled into the "deep draw" pocket ruptures rather than seals upon cooling. After deposition of the second length of the molten glass ribbon, air is blown into and through the air line/orifice and into contact with the interior of the glass article. This air aids in preventing the second length from significantly sagging or collapsing completely or partially down into the channel of the first length of the molten glass ribbon. On the other hand, if the pressing or plunger apparatus of a desired shape or surface design is brought into contact with the second length, while the air is blown through the line, the second length of the molten glass ribbon would be forced into substantial contact with the plunger surface.

The glass envelopes disclosed hereinabove are preferably comprised of a transparent glass material, preferably a hard glass exhibiting excellent thermal expansion characteristics selected from the group consisting of soda-lime silicate, borosilicate, aluminosilicate, boro-alurminosilicate and the like. For example, glass envelopes have been produced from Corning Code 7251 glass which consists essentially of the following composition, expressed in terms of weight percent on the oxide: 77.4% $SiO_2$, 5.3% $Na_2O$, 15.4% $B_2O_3$, 1.9% $Al_2O_3$, 0.48 Cl.

Upon completion of the molding operation it becomes necessary to trim the excess glass from the periphery of the glass article and thereafter remove the glass article A suitable trimming operation is one which, not only severs the product, supported by the mold, from the excess hot glass surrounding the periphery of the mold, but which results in a positive seal to the outside edges of both glass layers. Two suitable conventional trimming operations, one "male" and one "female", are disclosed respectively in U.S. Pat. No. 4,605,429 (Rajnik) and U.S. Pat. No. 3,528,791 (Giffen); both of which are hereby incorporated by reference. Furthermore, an abrasive waterjet, which removes material by a lapping-type action, or a laser-cutting technique may be utilized in the trimming operation.

Although the now preferred embodiments of the invention have been set forth, it will be apparent to those skilled in the art that various changes and modifications may be made thereto without departing from the spirit and scope of the invention as set forth in the following claims.

We claim:

1. A method for forming internally channeled glass envelope comprising the steps of:

(a) delivering and depositing a leading end of a molten glass ribbon to a surface of a mold having a mold cavity to form a first length of molten glass, said mold possessing at least one channel-forming groove and a peripheral surface wherein the molten glass ribbon overlies the mold cavity and the peripheral surface;

(b) causing the first length to substantially conform to the contour of the mold cavity thereby forming at least one channel in the first length of the molten glass ribbon;

(c) delivering and depositing a trailing end of said molten glass ribbon to the exposed surface of the earlier deposited first length to form a second length of the molten glass ribbon on said first length of molten glass, such that the second length of glass ribbon is folded over the first length of glass ribbon.

2. The method of claim 1 wherein said second length of glass ribbon is caused to fold over the first length by causing the mold to move in a first direction during deposition of the first length of glass ribbon, and a second direction during deposition of the second length of glass ribbon, said second direction being a predetermined path opposite to the first path.

3. The method of claim 1 wherein the viscosity of the glass ribbon at delivery is such that the second length (i) bridges, but does not sag into complete contact with, the channel of the first length and (ii) forms a hermetic seal wherever the first length of the molten glass ribbon contacts the second length of the molten glass ribbon to form a glass article with at least one enclosed channel.

4. The method of claim 1 wherein the mold further comprises two deep-draw areas at respective ends of said groove.

5. The method of claim 4 wherein during formation of the first length, molten glass is drawn into said deep-draw areas to form tubulation ports.

6. The method of claim 1 including the additional step of applying a vacuum to the under surface of the first length of the molten glass ribbon thereby causing the first length to substantially conform to the contour of the mold cavity channel forming groove.

7. The method as claimed in claim 1 including the step of pressing the second length into position using a plunger apparatus whereby the second length bridges but is not pressed into complete contact with the surface of the channel.

8. The method of claim 1 wherein the mold cavity further possesses a series of deep draw cavities into which the molten glass is drawn.

9. The method of claim 4 wherein the deep-draw areas is in communication with an air line and at least a partial vacuum condition is maintained during deposition of the first length resulting in the glass in the deep-draw areas remaining open to the air line.

10. The method of claim 4 wherein after deposition of the second length, air is blown into and through the air line and into contact with the molten glass.

11. The method of claim 6 including the further step of pressing the second length of molten glass of into position using a plunger apparatus, whereby the second length bridges but is not pressed into complete contact with the surface of the channel while the air is blown through the line, thereby forcing the second length into substantial contact with the plunger.

* * * * *